United States Patent

Horner et al.

[15] 3,636,391
[45] Jan. 18, 1972

[54] RECIPROCATING MOTOR WITH MAGNETIC DRIVE MEANS

[72] Inventors: Jack E. Horner, 233 E. Bay Street, Jacksonville, Fla. 32202; Jack K. Lanier, 5863 Hyde Park Circle, Jacksonville, Fla. 32210

[22] Filed: Oct. 7, 1970

[21] Appl. No.: 78,747

[52] U.S. Cl. ............................................. 310/24, 310/103
[51] Int. Cl. ............................................................ H02k 7/06
[58] Field of Search ............................... 310/20–24, 103, 310/30, 34, 35, 46, 37

[56] References Cited

UNITED STATES PATENTS

| | | | |
|---|---|---|---|
| 912,037 | 2/1909 | Seidel | 310/20 |
| 979,637 | 12/1910 | Backer | 310/37 |
| 1,283,430 | 10/1918 | Warren | 310/103 |
| 1,333,415 | 3/1920 | Henry | 310/103 |
| 1,672,807 | 6/1928 | Etzel | 310/103 X |
| 2,606,222 | 8/1952 | Clifford et al. | 310/103 X |
| 2,745,027 | 5/1956 | Williford, Jr. | 310/103 |
| 2,790,095 | 4/1957 | Peek et al. | 310/103 |
| 3,121,812 | 2/1964 | MacArthur | 310/20 X |

*Primary Examiner*—D. F. Duggan
*Attorney*—Edwin E. Greigg

[57] ABSTRACT

A motor which operates by mechanically reversing the polarity of a pair of permanent magnets by solenoid means, to alternately attract and repel a pair of similar magnets disposed at the opposite ends of oscillatable rocker arms which through proper timing thereof imparts a rotary motion to a power shaft. Through the use of a multiplicity of rocker arms disposed either in series or parallel arrangements, an increase in output power can be obtained in proportion to the number of magnet pairs used.

13 Claims, 14 Drawing Figures

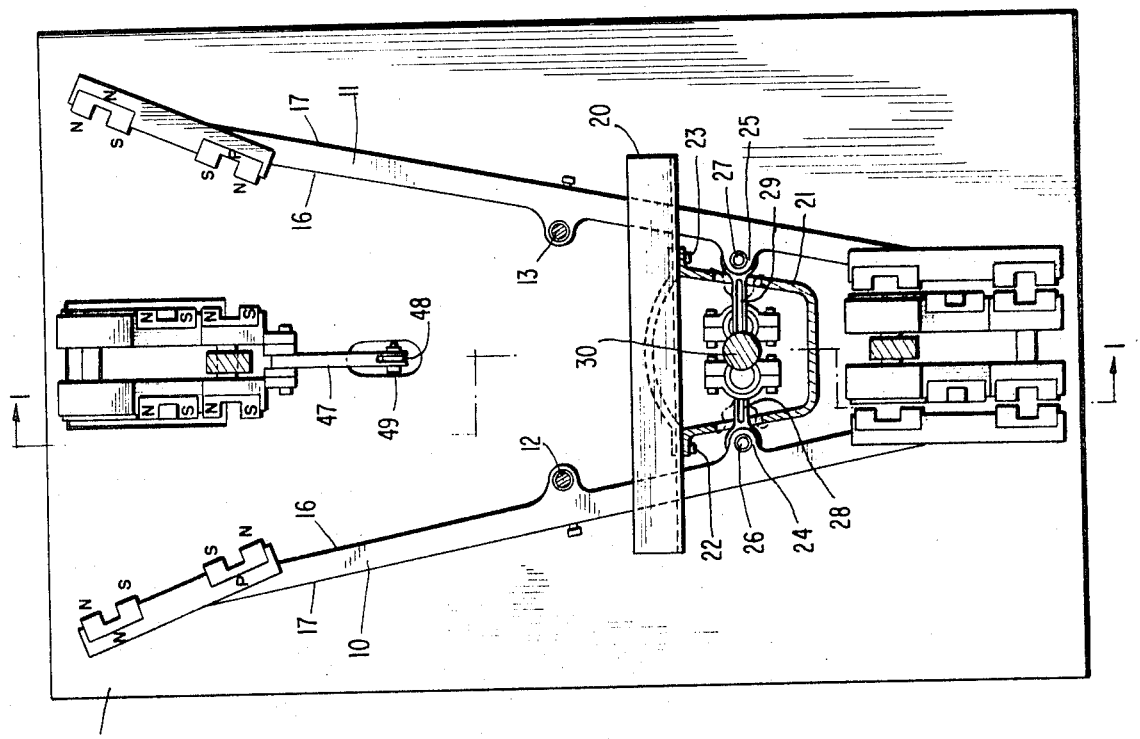
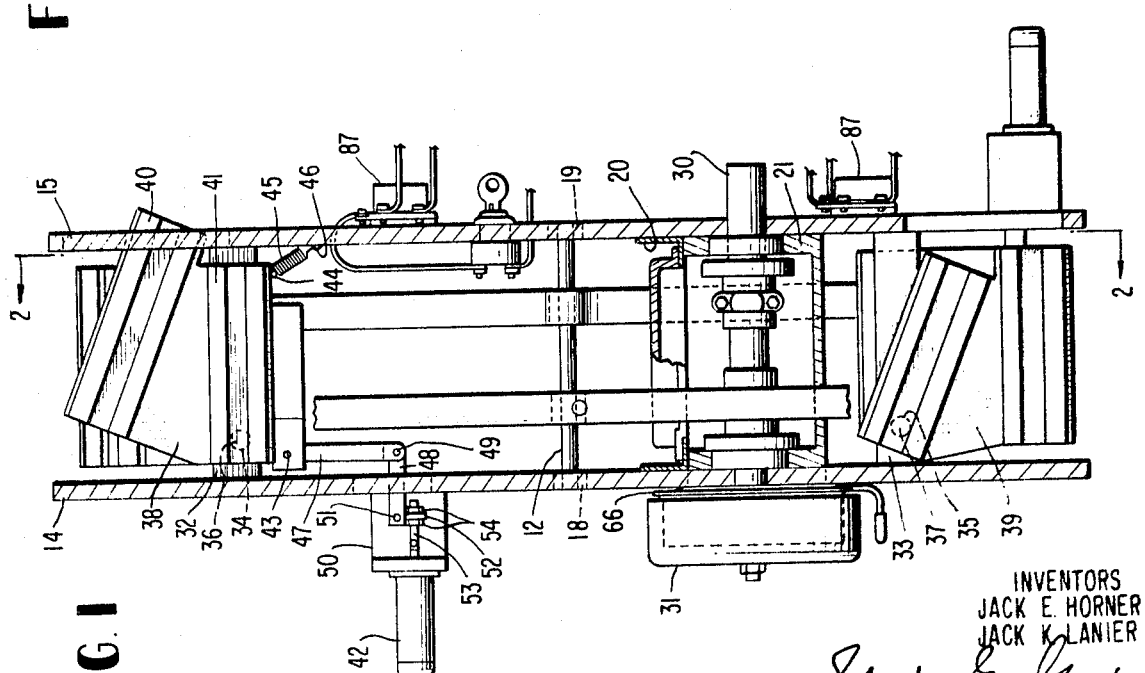

PATENTED JAN 18 1972
3,636,391
SHEET 3 OF 4
FIG. 5
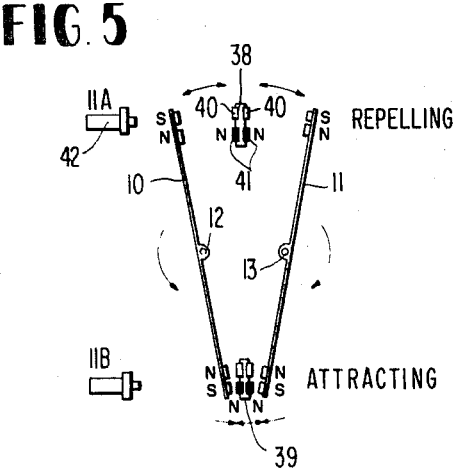
FIG. 6
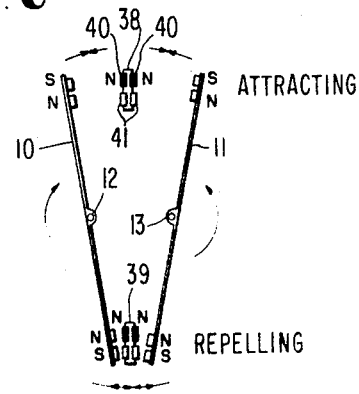
FIG. 7
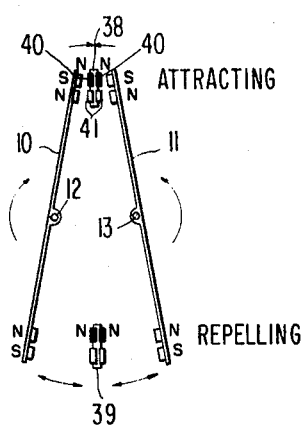
FIG. 8
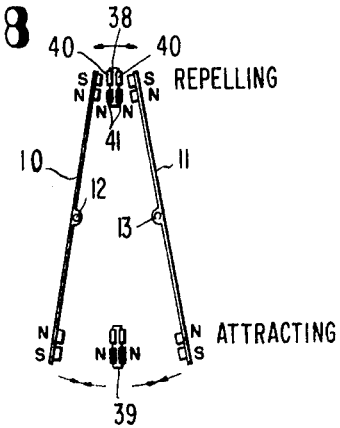
FIG. 9
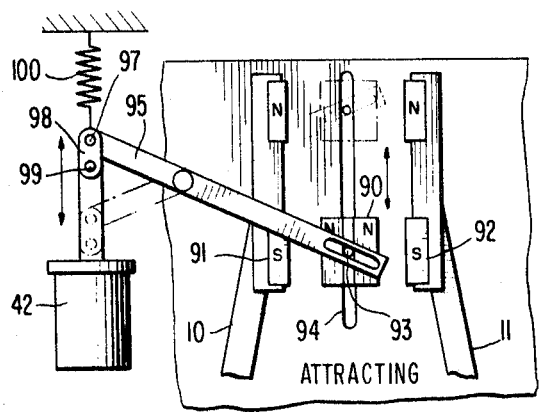
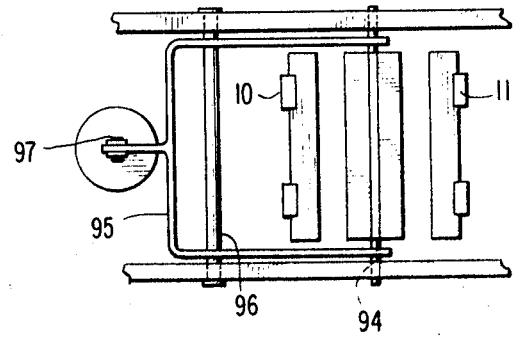
FIG. 10

FIG. 11
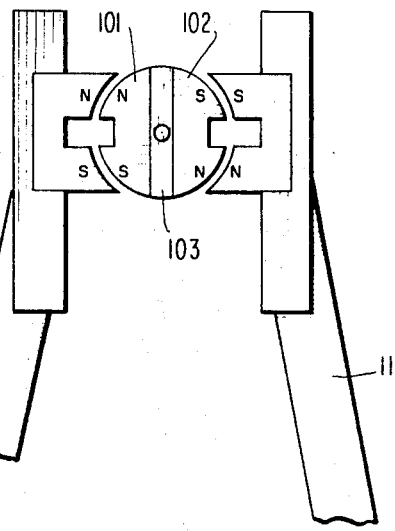
FIG. 12
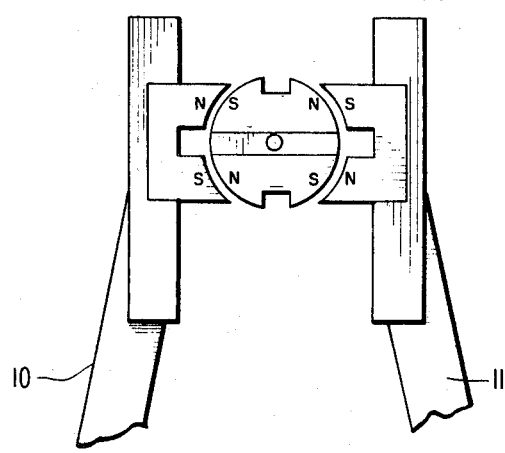
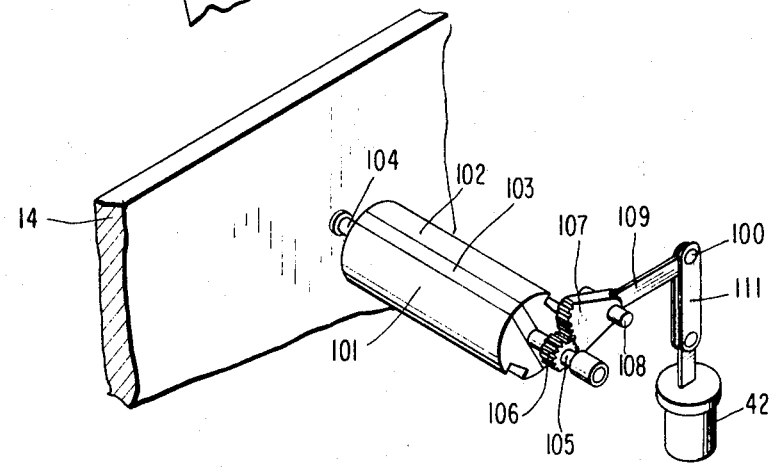
FIG. 13
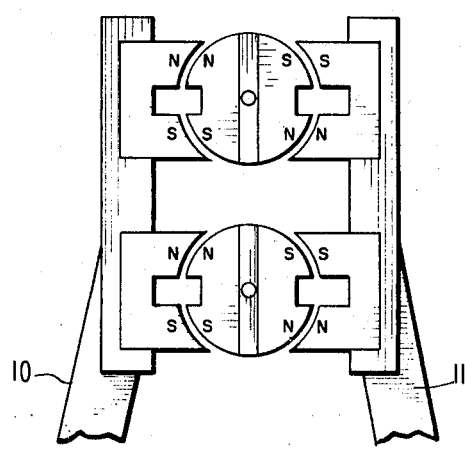
FIG. 14

3,636,391

RECIPROCATING MOTOR WITH MAGNETIC DRIVE MEANS

This invention pertains to a new motor and more particularly to a motor which utilizes permanent magnets to convert electrical energy into mechanical energy.

It is the principal object of the invention to provide a motor which will not pollute the atmosphere and which is capable of relatively high power output.

It is another object of this invention to provide a motor which operates on direct attraction and repulsion of permanent magnets, these forces being utilized to drive a power shaft.

It is a further object of this invention to provide a method of switching the apparent magnetic polarity of a permanent magnet assembly at a fast rate required to operate an oscillating motor.

It is a still further object of this invention to provide a method of switching the apparent polarity of a permanent magnet assembly by supporting magnets on a rocker plate and alternately oscillating them into position.

It is yet another object of this invention to provide a method of switching the apparent magnetic polarity of a permanent magnet assembly by translating the magnet radially to the power shaft.

It is another further object of this invention to change the magnetic polarity by rotating the magnet 180° about its axis in either an oscillatory or rotational manner.

It is another still further object of this invention to provide a method of increasing the power of this motor by disposing a multiplicity of arms and magnets radially about the power shaft within the same plane.

It is a further object of this invention to provide a method of increasing the power output of the motor by serially connecting two or more motors driving a common extended power shaft.

These and other objects and advantages will appear more clearly from the following specification taken in conjunction with the drawings, in which:

FIG. 1 is a front view cutaway drawing showing the rear housing removed;

FIG. 2 shows a view through the left side of the motor;

FIGS. 5, 6, 7 and 8 illustrate schematically the sequence of events in which magnetic force is used to drive the motor and achieve one complete revolution of the power shaft;

FIGS. 9 and 10 illustrate another embodiment of the invention wherein a shuttle assembly is substituted for the rocker arm assembly described earlier;

FIGS. 11 and 12 illustrate schematically a still further embodiment of the invention wherein a rotating magnet assembly is used in lieu of the rocker plate assembly;

FIG. 13 is a perspective view of the mechanism for rotating the magnet; and

FIG. 14 is a further embodiment of the construction shown in FIG. 11.

Figure 3:
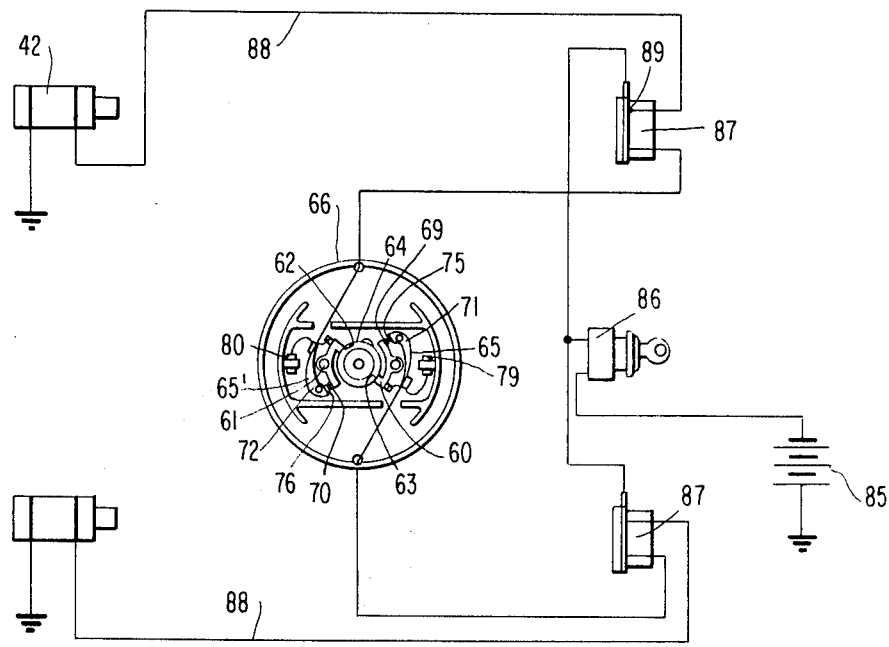
FIG. 3 is a top plan view of the timing plate assembly for the motor showing the circuitry therefor.

Turning now to the drawing and particularly FIG. 2 thereof which shows a horizontal end view of the motor, portions of which are shown in section, there is disclosed a pair of rocker arms 10 and 11 which are pivotally arranged in spaced opposed plates 14 and 15 by rod means 12 and 13, said arms including front and rear surfaces 16 and 17, respectively.

The inner surfaces 16, 16 of each of the pivotal arms are provided adjacent to the terminal portion thereof with pairs of magnets which are arranged so that of each pair at the end of the rocker arm one is of opposite polarity to the other, i.e., one is effectively a north pole, while the other is a south pole. The purpose of this construction will be better understood as the description progresses.

Referring at this time to FIG. 1, it will be noted that the main supporting means for the motor comprising spaced plate members 14 and 15 are suitably perforated at 18 and 19 provided with bushings, said bushings being arranged to receive the terminal portions of rod means 12 and 13 thereinto.

In parallel relation to the rod means 12 and 13, and about which the arms 10 and 11 oscillate, is securely positioned the supporting means 20 for the housing 21. As best shown in FIG. 2, the crankcase 21 is suitably bolted at 22 and 23, respectively to the supporting means 20.

The rockable arms 10 and 11 are provided with inwardly extending apertured ears 24 and 25, respectively, each aperture of which includes bearing means 26 and 27, respectively, and to which the offstanding terminal end portions of the connecting rods 28 and 29, respectively, are secured. Although not shown in the drawing in FIG. 2, it is to be understood that suitable seal means, such as bellow-type seals, are carried in the diametrically oppositely extending openings in the crankcase 21 and through which the connecting rods 28 and 29 are arranged to extend so as to be connected to the rockable arms 10 and 11.

The inner terminal portions of the connecting rods 28 and 29 are fastened in known manner to the power shaft 30, to one end of which is attached a flywheel 31 (FIG. 1).

Referring at this time again to FIG. 2, it will be seen that plates 14 and 15 are held in positive spaced relationship by means of parallel bars 32 and 33, each of which is perforated at 34 and 35, respectively, for a purpose now to be described. As indicated earlier herein, the rockable arms 10 and 11 are provided with pairs of permanent magnets, thus in order to drive the power shaft it becomes necessary to apply pulses thereto of such magnitude that it can function as the power medium of the motor.

Each of the parallel bars 32 and 33, which are perforated as explained earlier, is provided with a pin 36 and 37, respectively, about which rocker plate assemblies 38 and 39, respectively, are arranged to oscillate. As best shown in FIG. 1, the magnets 40 and 41, which are carried adjacent to the edges of their rocker plates, as clearly shown in the drawing, are mounted at angles to one another. The rocker plates are suitably oscillated by repelling them from their attracted position, now shown at the lower extremity of the arms 10 and 11 where they are in juxtaposed relation, as best seen in FIG. 2, by means of a solenoid 42 and suitable linkage means, to be described in further detail later. When this repulsion of the lower extremity of arms 10 and 11 takes place, the rocker plate is oscillated by a second solenoid actuating means (not shown in FIG. 1) into a position such as shown in the upper view in FIG. 1. It is believed apparent that those skilled in the art will understand that by constantly and alternately attracting and repelling the upper and lower portions of arms 10 and 11 by means of the rocker plates, pulses are applied through the connecting rods 28 and 29 to the power shaft 30, thus driving the transmission (not shown) to which the shaft is attached.

With further reference to FIG. 1, it is to be understood that rocker plate assembly 38 oscillates about pivot point 34 at pin 36. The lower corner extremity of each plate of the rocker plate assembly as viewed in the drawing is perforated to receive pivot bolt means 43 at its left end and a return spring means 45 at the other. Through the perforations at the lower right-hand corner of the rocker plate assembly 38 is looped an end of spring means 45, the other end of which is held under tension by screw means 46 affixed to the main frame support means 15.

Further in this view link 47 is shown as being parallel to the main frame support plate 14 with one terminal end secured to bolt 43, while the other end of link 47 is suitably perforated and affixed to bell crank 48 by bolt 49.

Further, the bell crank 48 is pivotally supported within solenoid support bracket 50 by pivot rod 51 which, in turn, passes through suitable perforations in bracket 50 and the other end of bell crank means 48 is provided with an apertured ear 52 extending at right angles to the plane of the bell crank as shown.

Thus, it can be seen by those skilled in the art that the rocker plate assembly 38 is held in one position against a stop (not shown) by the spring means 45 and that actuation of the solenoid 42 acts through the bell crank 48 and link 47 to oscillate the rocker plate assembly 38.

Referring at this time to FIG. 3, there is shown a pair of movable contact points 60 and 61 which are pivotally supported on mounting plate 66 by pivot pin means shown, said points 60 and 61 including rubbing surfaces 62 and 63 and contact points 69 and 70 at their extremities.

The mounting plate 66 is concentrically disposed relative to the power shaft 30 and though not shown is provided with a frictional mounting means rigidly attached to the main supporting means for the motor such that the mounting plate 66 may be rotated about its center.

Attached also to the mounting plate 66 are fixed contact point supports 71 and 72, respectively, each of which is held in positive relationship relative to the movable point means 60 and 61, said contact points including suitable contacts 75 and 76, respectively.

The flat steel springs 65 and 65', respectively, are securely affixed to each contact 69 and 70 of the movable points 60 and 61 to make good electrical contact, the other extremity being suitably perforated for attachment to the insulated screw terminals, as shown, said springs being so formed and tensioned to hold the rubbing surfaces 62 and 63 of the movable contact point means in intimate contact at all times with a cam 64 which has been ground or otherwise formed or affixed to the power shaft 30. Also shown in this view are two capacitors 79 and 80 suitably mounted and electrically grounded, as required.

The wires from each capacitor are attached by means of a terminal lug (not shown) to an insulated screw terminal.

To one skilled in the art it will be recognized that this construction thus forms a distributor with two sets of contact points with the points alternately closing and opening in timed sequence as the cam surface rotates with the power shaft.

The control circuit can be more clearly understood by referring to the diagram in FIG. 3 which also shows the distributor.

The solenoid 42 is actuated by electrically connecting its power terminal to a source of electrical energy through control circuitry 50 so that timing of the solenoid actuation imparts proper timing to the rocker plate assembly. This will now be explained in greater detail.

The source of control energy is a battery means 85 with the negative terminal connected to ground (main motor support means) and the positive terminal connected to suitable switch means 86. The second terminal of the switch means is connected by means of a line to relay means or coil terminal 87 as shown. A line 88 is used to connect second relay means coil terminal 89 to he insulated screw terminal 76 mounted on a fixed contact point support means 71. The insulated screw terminal means is electrically connected through the tensioning spring means 65 to the movable contact 69 supported by the movable point support means.

When the movable point contact 69 is forced into contact with the fixed contact means 75 by virtue of cam rotation and spring tension, the relay means is actuated. Thus, actuating the relay means 87 completes the circuit from the energy source 85 through the points within the relay means 87 to solenoid 42 thereby causing it to actuate.

To those skilled in the art it will be obvious that upon closure of the second set of timing point means the other relay means and solenoid means will be actuated.

It is also believed to be clear that by proper positioning of the mounting plate means 66 with respect to the main motor frame support means and power shaft 30 proper actuation of the solenoid 42 and oscillation of the rocker plate assemblies 38 and 39, respectively, can be achieved.

Figure 4:
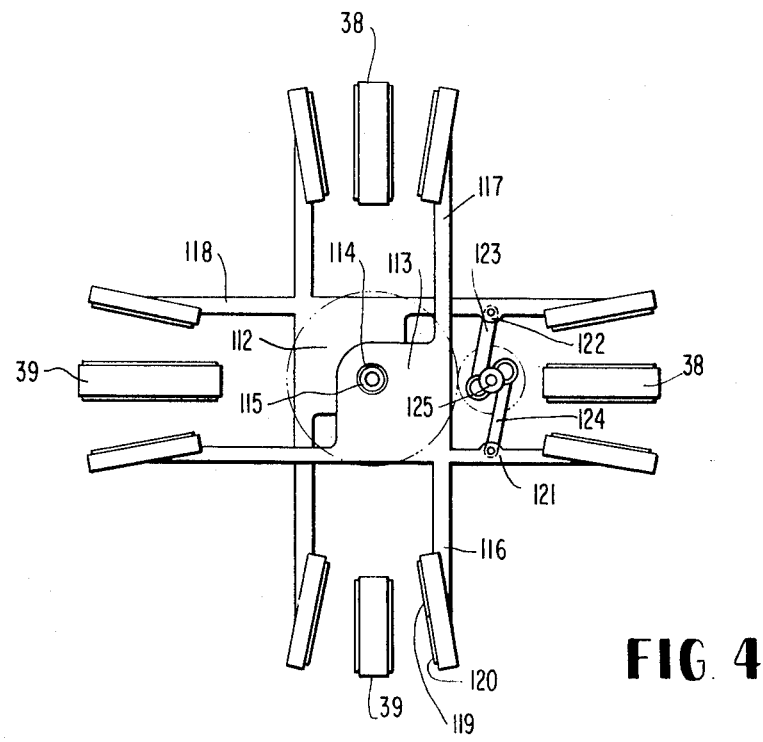
FIG. 4 illustrates a further embodiment of the motor in which the principle of the motor is applied in radial form and in which the number of pairs of driving magnets utilized in one plane is increased.

Referring now to FIG. 4 there is shown a further embodiment of the invention in which each rocker arm assembly means 112 is comprised of four arm extensions rigidly joined together in a perpendicular configuration.

A square plate 113 is rigidly attached to one corner formed by the intersection of two of said arms and is suitably perforated and fitted with bushing means 114 to form a pivot means 115. Each pair of arms 116 and 117 extending from the plate forms a rocker arm as previously described herein pivoting in rigid relationship about a common pivot bushing 114.

A second rocker arm assembly means 118 is mounted on the same pivot means 115 displaced from he same plane so as to be free to oscillate without interference. Said rocker arm assembly is mounted in an opposed relationship such that the pairs of rocker arms are formed as described earlier. Each rockable arm extension is provided with a pair of permanent magnets 119 and 120 adjacent to the terminal portions thereof as described earlier in connection with FIGS. 1 and 2. A single pair of opposed arms are provided with inwardly extending apertured ears 121 and 122 to which are secured the terminal end portions of the connecting rods 123 and 124 as previously described. The inner terminal portions of said connecting rods 123 and 124 are fastened to the power shaft 125. A second similar assembly is shown disposed between a second pair of opposed rockable arms and though not necessary to the operation of the motor can be used to advantage to divide power shaft loads for high-powered motors. When two or more power shaft assemblies are used, they must be connected by known means to one output shaft. Disposed between each opposed pair of rockable arm extensions is a rockable plate assembly bearing the numerals used earlier in FIGS. 1 and 2 and shown only in outline configuration and operated by a solenoid as previously described.

From a careful study of FIG. 4 it will be revealed to those skilled in the art that it is not necessary to limit the number of rockable arm extensions to four pairs, but rather the number may be increased and are limited only by the physical space required to allow the arms to oscillate.

Moreover, the power furnished by this construction can be further increased by disposing another rockable plate assembly between each of the adjacent arm extensions in the outwardmost position so as to attract or repel their terminal magnets in the same manner as when they are in their innermost position.

To those skilled in the art, it will also be apparent that there are other means of accomplishing substantially the same magnetic effects by replacing the aforedescribed rocker plate assembly with other devices falling within the spirit of this invention. By way of further examples note that as viewed in the drawing of FIG. 9 there is schematically shown a single pair of bar magnets 90 positioned between the lower pair of magnets 91 and 92 which are attached to rocker arm means 10 and 11 as hereinbefore described. In this illustration the plate 93 is shown in full lines and it is to be understood that the pair of magnets extends at right angles to the main frame support members 14 and 15 and into slots provided therein with the slots acting as a guide means for the vertical motion of the bar magnet assembly 90. In the full line position the arms 14 and 15 are being attracted and in the dotted line position they are being repelled to provide a further pulse to the shaft.

The plate 93 passing between the bar magnets is perforated and provided with two rectangular slots 94 adjacent to the main frame support plates 14 and 15 to receive yoke 95, more clearly shown in FIG. 10. The yoke is pivotally mounted with main frame support means 14 and 15 which is additionally perforated to receive pivot rod 96 and suitably bushed for long life.

At its extremity, yoke 95 is perforated to receive pivot bolt 97 to which link 98 is secured. The other terminal end of link 98 is secured by a second pivot bolt 99 (FIG. 9) to solenoid means 42 forming the actuating linkage to thereby translate bar assembly 90 in a vertical manner between rocker arm means 10 and 11. Spring means 100 is connected to pivot bolt 97 and secured under tension by any suitable means to the main frame support.

It can be seen that when solenoid 42 is deenergized the bar magnet assembly rests against a stop (not shown) in its lower position and thus attracting rocker arm means 10 and 11 and when solenoid 42 is energized, it lifts bar magnet assembly 90 to its upper position thus repelling rocker arm means 10 and 11.

Referring at this time to FIG. 11, there is shown another embodiment which may replace the rocker plate assemblies 38 and 39, as described earlier, these taking the form of shaped magnets 101 and 102 which are suitably mounted for rotation and carried by a plate support means 103.

The plate support means 103 for the magnets 101 and 102 is pivotally mounted withing the housing 14 and 15 by an integral pivot means, said pivot means being arranged to extend into perforations in the housing and suitably bushed for rotation, as well shown in FIG. 13, where a pinion gear 106 is suitably affixed to the end of shaft 105. Meshing with pinion gear 106 is sector gear 107 which is pivotally mounted in one wall of the housing 14 as shown. Main frame support member 15 is suitably perforated to accept pivot pin means 108 which is securely fastened by screw means or by press fit. The sector gear 107 is provided with an arm means 109 extending opposite to the pivotal means 108 and suitably perforated at its terminal end to receive a bolt 110. Attached thereto is link 111 perforated at both ends to form the connection between solenoid 42 and sector gear 107. By careful examination of this view one will appreciate that when solenoid means 42 is actuated, it pulls link means 111 which, in turn, pivots sector gear means 107 thereby causing the magnet assembly 101–103 to rotate by reason of its driving pinion gear 106.

From an examination of the views in FIGS. 11 and 12 one skilled in the art can see that to change from a repelling position shown in FIG. 11 to an attracting position shown in FIG. 12 requires only that the magnet assembly be rotated 90°. Other magnet arrangements are also contemplated which require rotation up to 180° to achieve similar effect. Moreover, to those skilled in the art it also will be conceivable that the magnets do not have to be disposed at 90°, but may be, assuming one starts from a point of 0°, positioned at from 30° or less up to 180°.

A still further embodiment of the rotary magnet assembly means shown in FIG. 11 can be seen by referring to the view in FIG. 14. Here, two magnet assembly means, as illustrated in FIG. 11, are pivotally mounted one above the other thus providing a method for doubling the attracting and repelling forces within the limited space. Although it is not shown in FIG. 14, it is to be understood that a drive gear may be positioned adjacent to the two pinions carried by the parallel shafts and arranged to simultaneously rotate the magnets.

That which is claimed is:

1. In a motor construction, the combination comprising, parallel spaced housing means, power shaft means positioned in said housing means, pivotal arm means having inner surface areas and end portions confined by said housing, permanent magnet means carried by said pivotal arm means adjacent the inner surfaces thereof, means associating said pivotal arm means with said power shaft means, and means arranged to alternately attract and repel first one and then the other of the end portions of said pivotal arm means to apply a driving force to said power shaft means.

2. In a motor construction as claimed in claim 1, wherein the housing means are positively correlated by rigid means, said rigid means including means to attract and repel the permanent magnet means carried by said pivotal arm means.

3. In a motor construction as claimed in claim 2, wherein the means to attract and repel the pivotal arm means are oscillatable relative to said rigid means.

4. In a motor construction as claimed in claim 3, wherein said oscillatable means is intermittently pulsed by power means.

5. In a motor construction as claimed in claim 4, wherein said power means includes solenoid means.

6. In a motor construction as claimed in claim 1, wherein said pivotal arm means comprise plural opposed elements.

7. In a motor construction as claimed in claim 5, wherein the solenoid is arranged to reciprocate.

8. In a motor construction as claimed in claim 1, wherein the pivotal arm means include elements positioned at least 90° apart in the same plane.

9. In a motor construction as claimed in claim 1, wherein the pivotal arm means are positioned in parallel planes to increase the torque on the power shaft means.

10. In a motor construction as claimed in claim 1, wherein the means arranged to alternately attract and repel the permanent magnets carried by said pivotal arm means reciprocates in a plane normal to said power shaft means.

11. In a motor construction as claimed in claim 1, wherein the means arranged to alternately attract and repel the permanent magnets carried by said pivotal arm means rotate in a plane parallel with said power shaft means.

12. In a motor construction as claimed in claim 11, wherein the rotary means comprise dual means arranged in parallel adjacent planes.

13. In a motor construction as claimed in claim 1, wherein the pivotal arm means include elements positioned in a range extending from 0° up to 180° apart in the same plane.

* * * * *